US012801619B2

(12) United States Patent
Chen et al.

(10) Patent No.: US 12,801,619 B2
(45) Date of Patent: Nov. 17, 2026

(54) DATA VISUALIZATION USING MACHINE LEARNING MODELS

(71) Applicant: PayPal, Inc., San Jose, CA (US)

(72) Inventors: Chongchen Chen, Shanghai (CN); Haiyuan Wu, Shanghai (CN); Zhenyu Qiao, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/758,686

(22) Filed: Jun. 28, 2024

(65) Prior Publication Data

US 2025/0371019 A1 Dec. 4, 2025

(30) Foreign Application Priority Data

May 31, 2024 (WO) ................ PCT/CN2024/096553

(51) Int. Cl.

*G06F 16/248* (2019.01)
*G06F 16/26* (2019.01)
*G06N 3/045* (2023.01)

(52) U.S. Cl.

CPC ............ *G06F 16/248* (2019.01); *G06F 16/26* (2019.01); *G06N 3/045* (2023.01)

(58) Field of Classification Search

None

See application file for complete search history.

(56) References Cited

U.S. PATENT DOCUMENTS

2003/0123721 A1* 7/2003 Megiddo ................. G06F 16/00 707/E17.023
2013/0103677 A1* 4/2013 Chakra ................. G06F 16/248 707/723
2014/0046923 A1* 2/2014 Ruble ..................... G06T 13/00 707/706

(Continued)

FOREIGN PATENT DOCUMENTS

CN 105589909 A 5/2016
CN 112199928 A 1/2021
CN 113641735 A 11/2021

OTHER PUBLICATIONS

Luo et. al, "ChartOCR: Data Extraction from Charts Images via a Deep Hybrid Framework", WACV 2021 (Year: 2021).*

(Continued)

*Primary Examiner* — Aleksandr Kerzhner
*Assistant Examiner* — Anugeetha Kunjithapatham
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to automating data visualization using machine learning. In some embodiments, a computer system receives a request for program instructions to render a graphical chart from data stored in a database of the computing system. The request includes an image of a desired graphical chart. The computer system applies a machine learning model to the image to determine one or more query parameters associated with the desired graphical (Continued)

chart. The computer system provides the requested program instructions to render the graphical chart. The requested program instructions include a database query specifying one or more query parameters to retrieve the data from the database. The computer system may render the graphical chart based on the provided program instructions.

19 Claims, 8 Drawing Sheets

(56) References Cited

U.S. PATENT DOCUMENTS

| | | | | |
|---|---|---|---|---|
| 2014/0330821 | A1* | 11/2014 | Tullis | G06F 16/248<br>707/728 |
| 2017/0004638 | A1 | 1/2017 | Csenteri et al. | |
| 2018/0165851 | A1 | 6/2018 | Apte et al. | |
| 2018/0307403 | A1 | 10/2018 | St-Jean et al. | |
| 2019/0324968 | A1* | 10/2019 | Kelly | G06N 20/00 |
| 2020/0159849 | A1 | 5/2020 | Tiwari et al. | |
| 2022/0083978 | A1 | 3/2022 | Weindling | |
| 2023/0177746 | A1 | 6/2023 | Shao et al. | |
| 2023/0274081 | A1* | 8/2023 | Fan | G06F 40/279<br>715/230 |
| 2023/0306070 | A1* | 9/2023 | Tata | G06F 40/103 |
| 2023/0315763 | A1 | 10/2023 | Kovachev et al. | |
| 2023/0343002 | A1 | 10/2023 | Zhang et al. | |
| 2024/0020895 | A1 | 1/2024 | Terasawa et al. | |
| 2024/0160673 | A1* | 5/2024 | Dela Rosa | G06V 20/20 |
| 2025/0131027 | A1* | 4/2025 | Chen | G06F 16/532 |
| 2025/0307552 | A1* | 10/2025 | Ebrahimi | G06F 40/284 |

OTHER PUBLICATIONS

International Search Report and Written Opinion in PCT Appl. No. PCT/CN2024/096553 mailed Dec. 25, 2024, 9 pages.

* cited by examiner

DATA VISUALIZATION USING MACHINE LEARNING MODELS

PRIORITY CLAIM

The present application claims priority to PCT Appl. No. PCT/CN2024/096553, entitled "DATA VISUALIZATION USING MACHINE LEARNING MODELS", filed May 31, 2024, which is incorporated by reference herein in its entirety.

BACKGROUND

Technical Field

This disclosure relates generally to computer systems and, more specifically, to using machine learning models to automate data visualization, according to various embodiments.

Description of the Related Art

Software development is often an intricate and laborious process, influenced by numerous factors. The complexity may arise from the potential for multiple interconnected components to interact in unpredictable ways, increasing the likelihood of bugs or errors being introduced. Such software errors may negatively impact computer performance. Each software development project presents unique requirements and challenges that can impact development timeframes. Moreover, issues unrelated to code correctness, such as those related to the development environment, tooling, DevOps, servers, and other infrastructure, can also hinder the software development process. Furthermore, many tools used in software development, including programming languages, application programming interfaces, and operating systems, may be cumbersome to operate, further complicating the development process.

DETAILED DESCRIPTION

Figure 1:
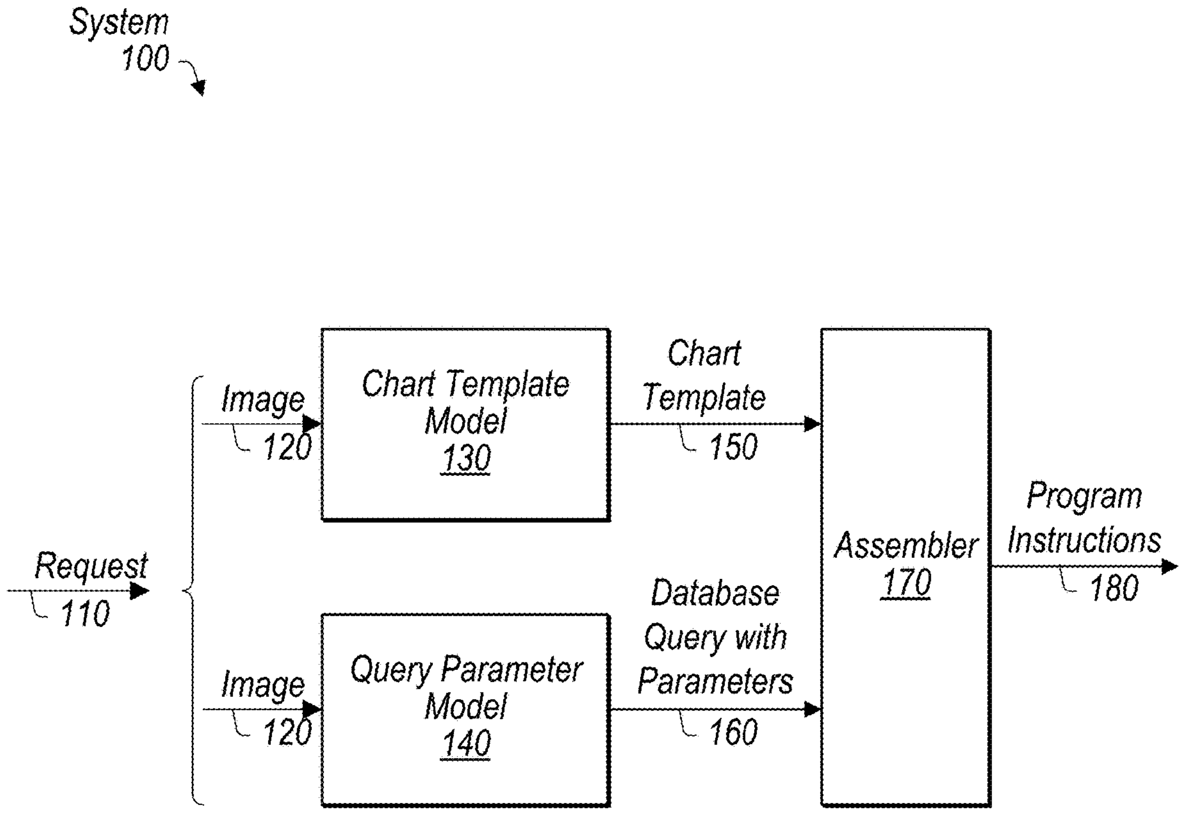
FIG. 1 is a block diagram of one embodiment of a system for generating program instructions executable to render data visualizations using a chart template model and a query parameter model.

Machine learning models, such as large language models (LLMs), have the potential to revolutionize software development by generating code. A software developer, for instance, may be able to provide a description of desired functionality and receive corresponding code that performs that functionality without having to write each line of code. This capability, however, is tempered by the limitation that LLMs are prone to hallucinations (e.g. generating incorrect output data), which can result in generated code being flawed or non-functional. This issue can be further compounded when the code is expected to produce results based on real-world data, such as generating a user interface featuring a visualization derived from actual data. For example, a user may want to create a user interface component that presents a chart based on underlying data. Relying on an LLM to produce the code for this component, unfortunately, may lead to hallucinations about the data itself or how the chart is implemented, potentially resulting in a misleading or inaccurate chart, in this example.

The present disclosure describes embodiments in which a computing system uses machine learning models to automate providing program instructions for rendering data visualizations, such as graphical charts, based on data from a database, but the system implements the machine learning models in manner that reduces the potential for model hallucination to result in misleading or inaccurate output. As will be discussed below in various embodiments, the computing system can receive a request for program instructions to render a graphical chart from data stored in a database. For example, a user may provide a hand sketch of a desired pie chart with different portions sized based on data present in the database. The computing system can apply a machine learning model to the hand sketch image to determine one or more query parameters associated with the desired graphical chart for inclusion in a corresponding database query to retrieve the relevant data from the database. The computing system can then provide program instructions including the query for rendering the graphical chart. In various embodiments, the computing system further determines what program instructions to provide based on a stored set of chart templates that include predetermined program instructions for rendering various types of charts. The computing system uses the provided image of the desired chart to select a particular one of the chart templates by applying an image encoding model to the image to determine an image embedding indicative of the chart type and selecting a particular chart template with a close corresponding embedding. The program instructions of the chart template can then be executed to render a chart populated using data retrieved from the database using the determined database query.

This approach can greatly reduce the potential for model hallucination to result in misleading or inaccurate output. Because, in some embodiments, a machine learning model is used to determine parameters for a query submitted to a database storing data, the resulting chart is rendered based on actual data rather than potentially hallucinated data. Furthermore, because, in some embodiments, a machine learning model is used to select a predetermined set of program instructions in the form of a chart template, the model is not determining program instructions itself, which may be incorrect, to render the resulting chart. Thus, the techniques described herein may be able to significantly reduce the development time for writing code to provide some desired data visualization while also avoiding the pitfalls of relying on an LLM to arbitrarily generate code and potential results. More generally, the techniques described herein improve the functioning of a computer using a machine learning model as these techniques can be applied to reduce the opportunities in which the model can hallucinate producing faulty outputs. These techniques also effect an improvement on the technical field of artificial intelligence by addressing a problem associated with machine learning models.

Turning now to FIG. 1, a block diagram of a computing system 100 configured to implement these techniques is depicted. In the illustrated embodiment, computing system 100 receives a request 110 including an image 120 that is provided to a chart template model 130 and a query parameter model 140. The outputs of models 130 and 140 are provided to an assembler 170 that outputs a set of program instructions 180 for rendering a graphical chart. In some embodiments, system 100 may be implemented differently than shown. For example, system 100 may include one or more components for rendering a chart such as discussed below with FIG. 4.

Request 110 is a request for program instructions to render a chart that includes graphical information. As noted, request 110 can include an image 120 of a desired graphical chart such as a pie chart, line graph chart, bar graph chart, scatter plot, area chart, etc. Image 120 may be obtained using any of various approaches such as a hand-drawn sketch of a chart that is captured via a camera in a user's phone, an annotated screenshot of some existing chart, an image of a chart generated by some tool such as a spreadsheet application, etc. Request 110 may also include other suitable information such as a general description provided by a user, metadata about particular parameters to be depicted in the graph, identified filters to be applied to data used to populate graph, information collected from a user interface from a user, etc.

Chart template model 130 is a set of program instructions executable to select a chart template 150 relevant to a received request 110. As will be described with respect to FIGS. 2A and 2B, chart template model 130 may access a template database that includes multiple chart templates 150, each including program instructions for generating a particular type of chart based on a provided set of data. For example, chart templates 150 may include a first chart template including program instructions for generating a pie chart, a second chart template including program instructions for generating a bar graph, and so forth. In some embodiments, chart templates 150 employ a chart library such as Apache® Echarts, Pychart, Chart.js, etc. As will be discussed, chart template model 130 may generate an image embedding from image 120 to identify a chart template 150 closely resembling image 120.

Query parameter model 140 is a set of program instructions executable to determine a database query 160 for retrieving the data used to populate a rendered graphical chart. As will be described with respect to FIG. 3, query parameter model 140 uses image 120 to determine various parameters/query logic to include in the database query 160 such as field names for fields in the database, table names of tables to be searched and joined, filters for restricting selected data, sorting criteria, function calls for performing various aggregation operations, etc. For example, image 120 may include labels for various components in the desired chart, which are then used as query parameters in query 160. In various embodiments, queries 160 are expressed in a standardized language understood by the database such as a structured language query (SQL). Parameters determined by query parameter model 140 may also be used to label various components in a rendered chart such as portions of a pie chart, horizonal and vertical axes, units, quantities, etc.

Assembler 170 is a set of program instructions executable to assemble a selected chart template 150 and a determined database query 160 into a package of program instructions 180 usable to render a graphical chart. In some embodiments, assembler 170 binds chart template 150 code to query logic present in a determined query 160, which may include inserting one or more query parameters into template 150. For example, if a given query 160 includes a field name that is also an axis label, assembler 170 may insert the field name in the appropriate location in template 150, so that it correctly appears as the axis label when the chart is rendered. Assembler 170 may also bind query results to template axes so that the chart correctly depicts date results with respect to the correct template axis in the chart. In some embodiments, assembler 170 may also package a selected chart template 150 and database query 160 with additional library code, a code interpreter, and/or other program instructions executable to render a chart.

As will be discussed next, in some embodiments, chart templates 150 may undergo preprocessing as they are assembled into a template database to enable a faster searching for a particular chart template 150 when a given request 110 is received.

Figure 2A:
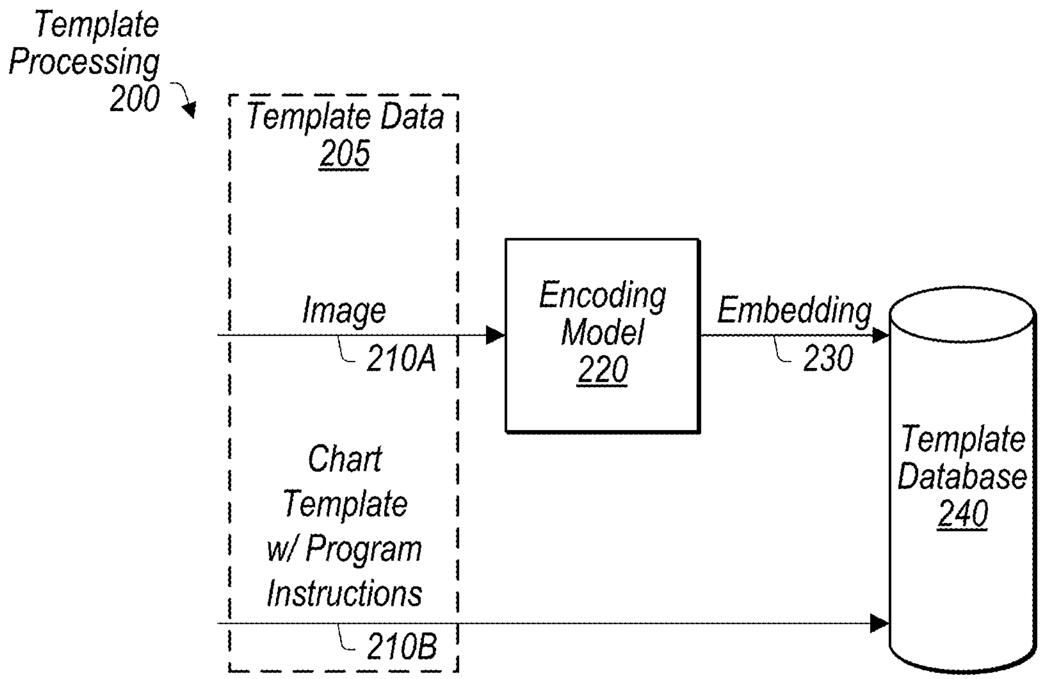
FIG. 2A is a block diagram of one embodiment of chart template processing to populate a template database.

Turning now to FIG. 2A, a block diagram of template processing 200 is shown. In the illustrated embodiment, template processing 200 includes receiving a set of template data 205 for a given chart template 150 that includes an image 210A and corresponding program instructions 210B. Processing 200 also includes using an encoding model 220 and a template database 240. In some embodiments, template processing 200 may be implemented different than shown such as in some embodiments in which searching for a template 150 is performed without using embeddings.

Encoding model 220 is a machine learning model operable to produce an embedding 230 from a received image 210A indicative of a type of chart that can be produced when executing program instructions 210B. Image 210A may be obtained using any suitable approach. For example, image 210A may be an image captured from generating a chart using the template 150, an image captured from documentation about the chart template 150, etc. Encoding model 220 may generate a vector/embedding 230 indicative of a feature set of image 210A by using a neural network model such as a convolutional neural network (CNN) or a vision transformer (ViT). Accordingly, model 220 may perform preprocessing including resizing image 210A, feature extraction using convolution operations, applying one or more embedding layers, etc. In some embodiments, encoding model 220 is implemented using RegNet, ConvNEXT, VGG-16, or DenseNet.

Template database 240 is a database that stores an embedding 230 generated for a given chart template 150 along with its corresponding program instructions 210B. In various embodiments, template processing 200 is performed for each template 150 supported by system 100 such that database 240 includes multiple embeddings 230 for multiple templates 150. For example, database 240 may include a first embedding 230 for a pie chart image 210A and instructions 210B for rendering it, a second embedding 230 for a bar chart image 210A and its instructions 210B, and so forth. As will be described next, chart template model 130 can use embeddings 230 to search for a relevant chart template 150 for a given request 110. To reduce the time in determining a search result, template processing 200 for templates 150 may be performed before receiving a request 110.

Figure 2B:
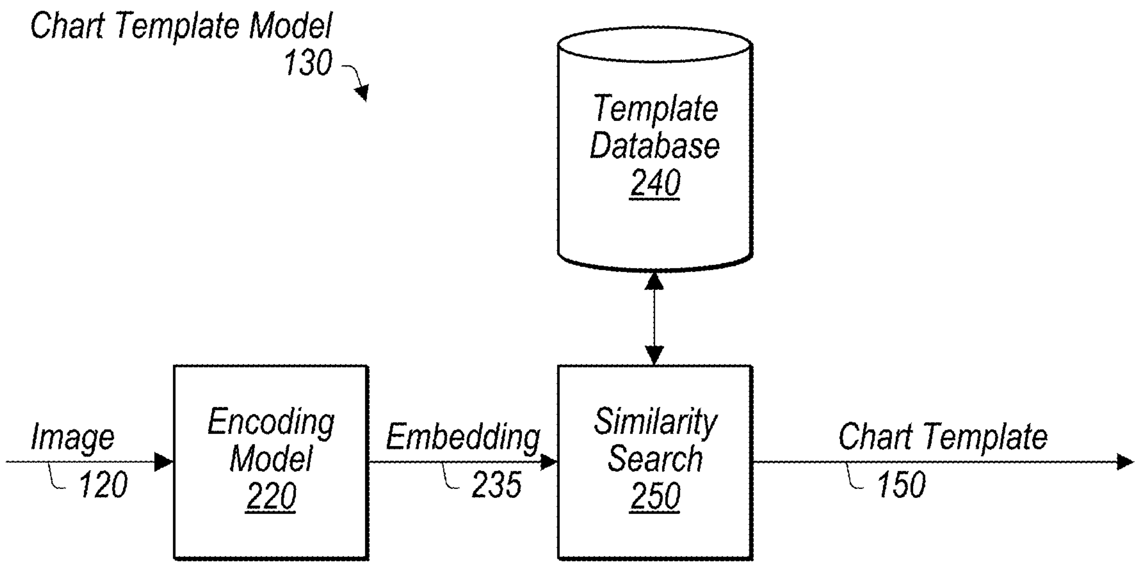
FIG. 2B is a block diagram of one embodiment of a chart template model that selects a chart template from a template database.

Turning now to FIG. 2B, a block diagram of a chart template model 130 is shown. In the illustrated embodiment, model 130 receives an image 120 indicative of a desire chart from request 110 and provides the image 120 to encoding model 220 discussed above to produce embedding 235 indicative of a feature set of the chart included in image 120. As shown, this embedding 235 may then be used as an input to similarity search 250.

Similarity search 250 is algorithm that attempts to identify the most relevant chart template 150 based a given embedding 235. In some embodiments, search 250 includes determining cosine similarities between an embedding 235 from image 120 and each of the embeddings 230 stored in template database 240. Search 250 may then select a chart template 150 having the closest similarly for the output of a chart template 150. In another embodiment, search 250 determines Euclidean distances between an embedding 235 and each of embeddings 230 and selects the template 150 having the shortest distance. In other embodiments, search 250 may use other approaches to identify a relevant chart template 150. Search 250 may also identify a set of most relevant chart templates 150 and output a particular template 150 based on a user selecting one from the set. As previously discussed, because chart template model 130 is selecting a chart template 150 that includes predetermined program instructions, in the illustrated embodiment, model 130 is not generating its own instructions and thus prevents hallucination from generating incorrect instructions.

As a selected chart template 150 merely includes the program instructions 210B for rendering a chart and does not include the data, query parameter model 140 may be used to generate the database query 160 providing the relevant data as will be discussed next.

Figure 3:
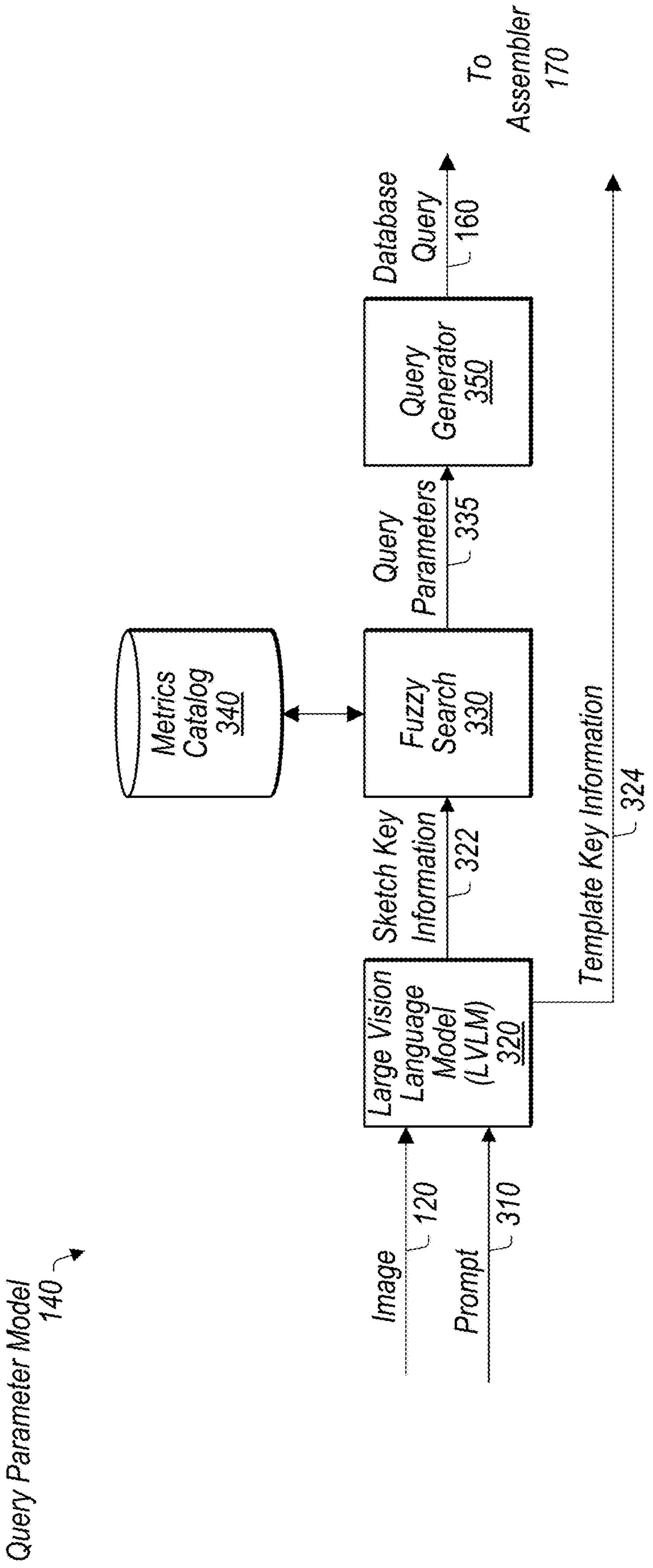
FIG. 3 is a block diagram of one embodiment of a query parameter model that determines a database query.

Turning now to FIG. 3, a block diagram of a query parameter model 140 is shown. In the illustrated embodiment, query parameter model 140 includes a large vision language model (LVLM) 320, a fuzzy search operation 330, a metrics catalog 340, and a query generator 350. In other embodiments, model 140 may be implemented differently. In other embodiments, model 140 may be implemented differently such as using a different type of machine learning model 320 than an LVLM, a different type of search 330 than a fuzzy search, etc.

LVLM 320 is a particular type of machine learning model that combines natural language processing (NLP) and computer vision to determine a set of features associated with an image 120 based on a received prompt 310. LVLM 320 may correspond to any suitable LVLM such as Large Language-and-Vision Assistant (LLaVa), GPT-4 Vision, or Fuyu. In the illustrated embodiment, a prompt 310 is provided to LVLM 320 to ask it to identify a set of relevant features associated with the received image 120. For example, prompt 310 may inform the LVLM 320 that it is examining a chart and ask it to retrieve key information in the chart such as metric names, dimension names, filters, etc. In the illustrated embodiment, this identified information could include one or more potential query parameters present in the image 120, shown as sketch key information 322. This identified information could also include information used to populate values in a template 150 shown as template key information 324. For example, template key information 324 may include the names of the x- and y-axes for a particular chart that are visually extracted from image 120 using LVLM 320.

Because potential query parameters included in information 322 may not correspond to actual query parameters used by the database, fuzzy search 330 attempts to determine the correct query parameters 335 so that they can be included in a query 160 that can be understood by the database. As used herein, the phrase "fuzzy search" refers to a type of search that attempts to find results that approximately match a query, rather than requiring an exact match. In the illustrated embodiment, search 330 accesses metrics catalog 340 storing various actual metrics/query parameters understood by the database system to determine query parameters 335 potentially relevant to sketch key information 322. For example, metrics catalog 340 may store the names of data fields, table names, metric names, dimension names, filters, or other parameters understood by the database. Accordingly, fuzzy search 330 may attempt to match one or more potential query parameters included in information 322 with actual query parameters in metrics catalog 340 by determines editing distances between the one or more potential query parameters and the actual query parameters in the parameter catalog and selecting the parameters with the shortest distances to provide as query parameters 335 to query generator 350. For example, if image 120 depicted a pie chart identifying sales of a particular widget on a per month basis during the last year, key information 322 might identify the widget name, sales, month, and last year. Fuzzy search 330 may then determine that catalog 340 includes a table named "widget_sales," a filter for last year, a grouping by month, etc. Search 330 may also be able to account for misspellings such as if the widget name were written incorrectly in the image 120.

Query generator 350 assembles the query parameters 335 determined from fuzzy search 330 into database query 160 that can be understood by the database storing the data for populating the chart. Continuing with the widget example above, the generated database query 160 may include the SQL statement: "SELECT EXTRACT(MONTH FROM order_date) AS month, COUNT(*) AS num_sales FROM widget_sales WHERE order_date>=DATE_SUB(CURRENT_DATE, INTERVAL 1 YEAR) GROUP BY month." As previously discussed, database query 160 is generated in a format supported by both assembler 170 and a chart data database (not shown) thanks to its provenance from metrics catalog 340.

As shown, the determined query 160 may then be provided to assembler 170 (along with a selected chart template 150) for inclusion in a set of program instructions 180 executable to render the chart. A system that uses these instructions 180 to render a chart will now be discussed.

Figure 4:
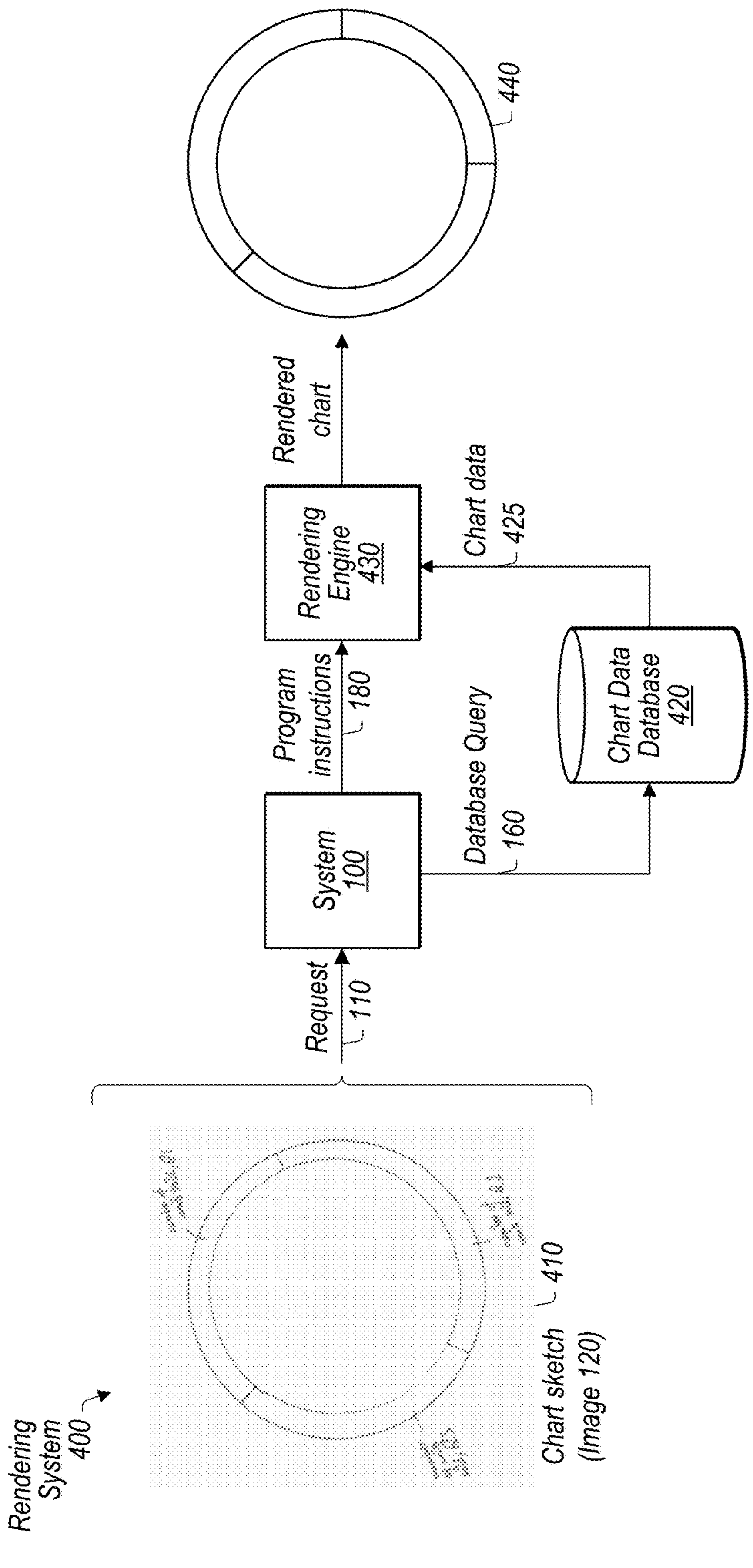
FIG. 4 is a block diagram of one embodiment of a system for rendering a chart based on an input chart sketch.

Turning now to FIG. 4, a block diagram of a rendering system 400 for rendering a chart is depicted. In the illustrated embodiment, system 400 includes the components of system 100 (described with respect to FIG. 1), a chart data database 420, and a rendering engine 430. In some embodiments, system 100 may be implemented differently than shown. For example, system 400 may render a chart using data from another source such as manual entry of chart data, data generated dynamically, data provided by one or more sensors, etc.

As has been discussed, system 100 may receive a request 110 that includes an image 120 such as a chart sketch 410, which is a hand sketch depicting a pie chart that includes labels assigned to the three pieces of the pie. System 100 may then generate program instructions 180 for rendering engine 430. In the illustrated embodiment, system 100 also provides a database query 160 to chart data database 420—although, in other embodiments, rendering engine 430 may be responsible for sending query 160, which may be included in program instructions 180 and later extracted by engine 430 from the instructions 180.

Chart data database 420 is a database that stores data usable to render a given chart. As shown, database 420 can receive a database query 160 and retrieve the corresponding chart data 425. For example, system 100 may decern from the labels on the pie chart portions in sketch 410 that the pie chart portions pertain to a particular database field aggregated into three groups and identify the field and grouping in a database query 160. Database 420 may retrieve the relevant data for this field and aggregate the data as indicated in the query 160 to produce chart data 425. Database 420 may then provide this data 425 to rendering engine 430.

Rendering engine 430 renders chart 440 using program instructions 180 and chart data 425. For example, program instructions 180 specify the pie chart parameters (e.g., colors, width, thickness, number of sections in the pie chart, etc.) while chart data 425 may be used to size different portions of the pie chart 440 depicted in FIG. 4. Although rendering engine 430 may be implemented in any suitable manner, in some embodiments, rendering engine 430 is a widget implemented in a webpage to render a chart 440, which may be an embedded image, HTML code, a lossless graphics format, a PDF file, etc.

Figure 5A:
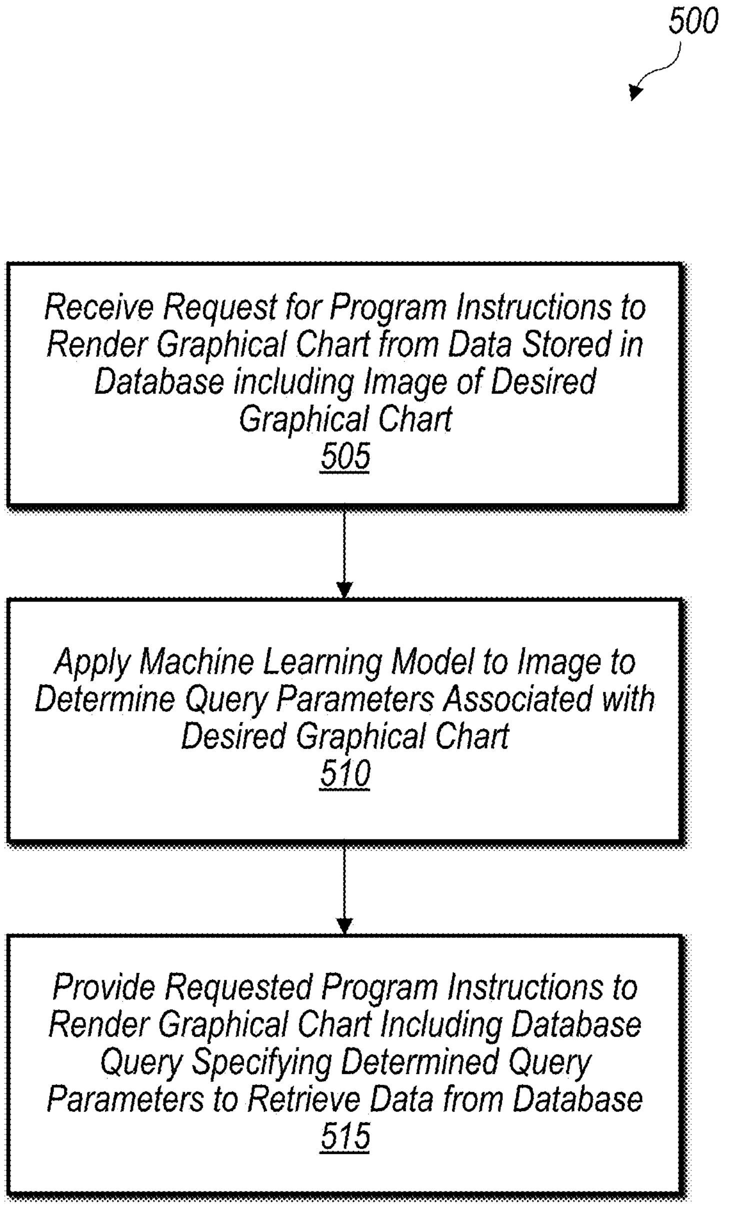
FIGS. 5A-C are flow diagrams illustrating embodiments of methods implementing techniques described herein.

Turning now to FIG. 5A, a flow diagram of a method 500 is shown. Method 500 is one embodiment of a method performed by a computing system 100. Method 500 may be performed by executing a set of program instructions stored on a non-transitory computer-readable medium.

Method 500 begins in step 505 with the computing system receiving a request for program instructions to render a graphical chart from data stored in a database accessible to the computing system. The request includes an image (e.g., image 120) of a desired graphical chart.

In step 510, the computing system applies a machine learning model (e.g., query parameter model 140) to the image to determine one or more query parameters associated with the desired graphical chart. In some embodiments, the machine learning model includes a large visual language model (LVLM). In some embodiments, determining the one or more query parameters includes identifying, based on applying the LVLM on the image, one or more potential query parameters present in the image and performing a search operation using the one or more potential query parameters and a parameter catalog (e.g., metrics catalog 340) of actual query parameters supported by the database to determine the one or more query parameters to be specified by the database query. In some embodiments, the search operation includes a fuzzy search (e.g., fuzzy search 330) that determines editing distances between the one or more potential query parameters present in the image and the actual query parameters in the parameter catalog. In some embodiments, the actual query parameters in the parameters catalog include metric names, dimension names, and filters.

In step 515, the computing system provides the requested program instructions to render the graphical chart, the requested program instructions including a database query (e.g., database query 160) specifying the determined one or more query parameters to retrieve the data from the database. In some embodiments, the computing system renders, the graphical chart based on the provided program instructions, the rendering including issuing the database query to the database to retrieve data stored in the database and representing the retrieved data in the rendered graphical chart (e.g., chart 440).

In various embodiments, method 500 further includes the computing system applying an image encoding model (e.g., model 220) to the image of the desired graphical chart to produce a graphical chart embedding and selecting, based on the graphical chart embedding, a chart template (e.g., chart template 150) from a chart template database (e.g., template database 240) that includes program instructions for a plurality of chart templates. The provided program instructions include program instructions of the selected chart template. In some embodiments, the selecting includes determining cosine similarities (e.g., similarity search 250) between the graphical chart embedding and embeddings corresponding to the chart templates and selecting the chart template having a closest one of the cosine similarities. In some embodiments, prior to receiving the request for program instructions, the computing system applies the image encoding model to images of graphical charts (e.g., images 210A) created using the chart templates to produce chart template embeddings and stores the chart template embeddings (e.g., embeddings 225) in the chart template database. In some embodiments, the selecting includes identifying the desired graphical chart as a pie chart and selecting, from a chart template database, a chart template that includes program instructions for rendering the pie chart; the database query is executable by the database to retrieve data usable to size different portions of the pie chart.

Figure 5B:
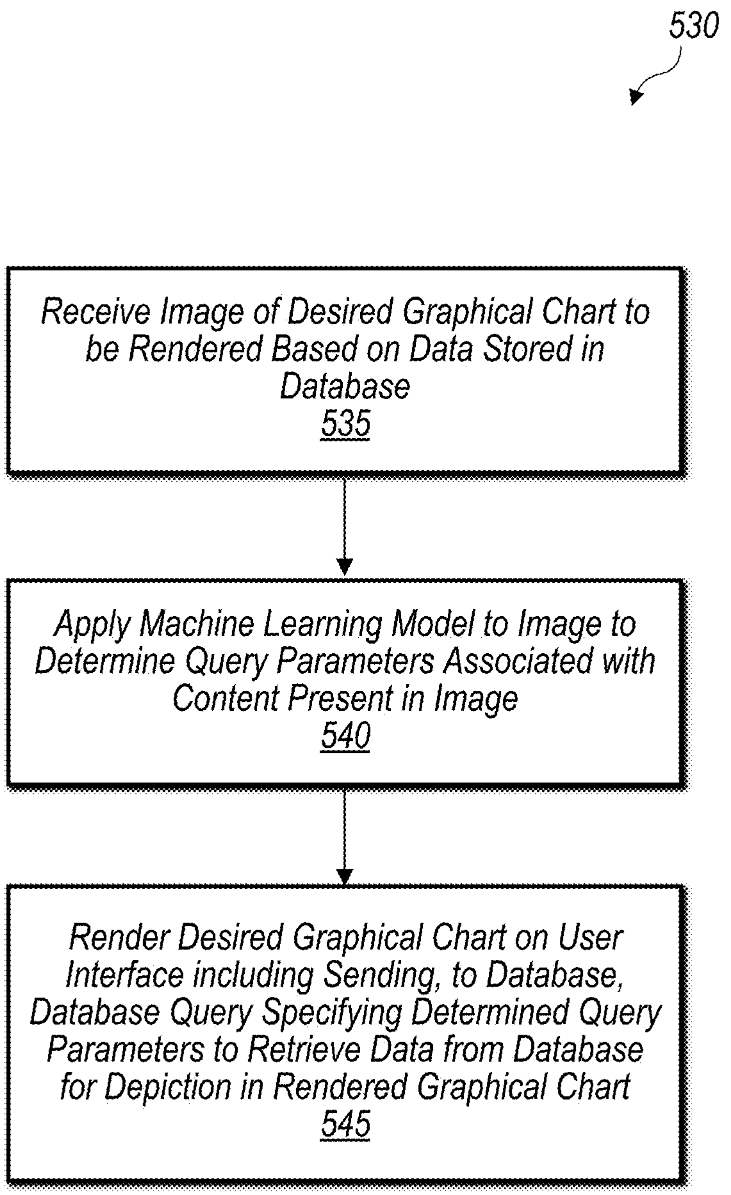

Turning now to FIG. 5B, a flow diagram of a method 530 is shown. Method 530 is one embodiment of a method performed by a computing system to render a graphical chart such as computing system 100. Method 530 may be performed by executing a set of program instructions stored on a non-transitory computer-readable medium.

Method 530 begins in step 535 with the computing system receiving an image (e.g., image 120) of a desired graphical chart to be rendered based on data stored in a database (e.g., database 420). In step 540, the computing system applies a machine learning model (e.g., query parameter model 140) to the image to determine one or more query parameters associated with content present in the image. In some embodiments, the computing system applies the machine learning model to identify one or more axis labels present in the image such that the rendered graphical chart presents the identified one or more axis labels. In some embodiments, the machine learning model includes a large visual language model (LVLM) operable to process a hand drawn (e.g., chart sketch 410) depiction of the desired graphical chart in the image and a corresponding text description of the desired graphical chart. In step 545, the computing system renders the desired graphical chart (e.g., chart 440) on a user interface. In various embodiments, the rendering includes sending, to the database, a database query (e.g., database query 160) specifying the determined one or more query parameters to retrieve the data from the database for depiction in the rendered graphical chart.

In various embodiments, method 530 further includes the computing system applying an image encoding model (e.g., encoding model 220) to the image of the desired graphical chart to produce a graphical chart embedding indicative of a type of graphical chart. The computing system selects, from a chart template database (e.g., template database 240), a chart template (e.g., template 150) that includes program instructions for rendering the type of graphical chart, the rendering including executing the chart template. In some embodiments, the type of chart is a bar graph chart; the determined query parameters include one or more query parameters identifying particular data usable to determine sizes of bars in the bar graph chart.

Figure 5C:
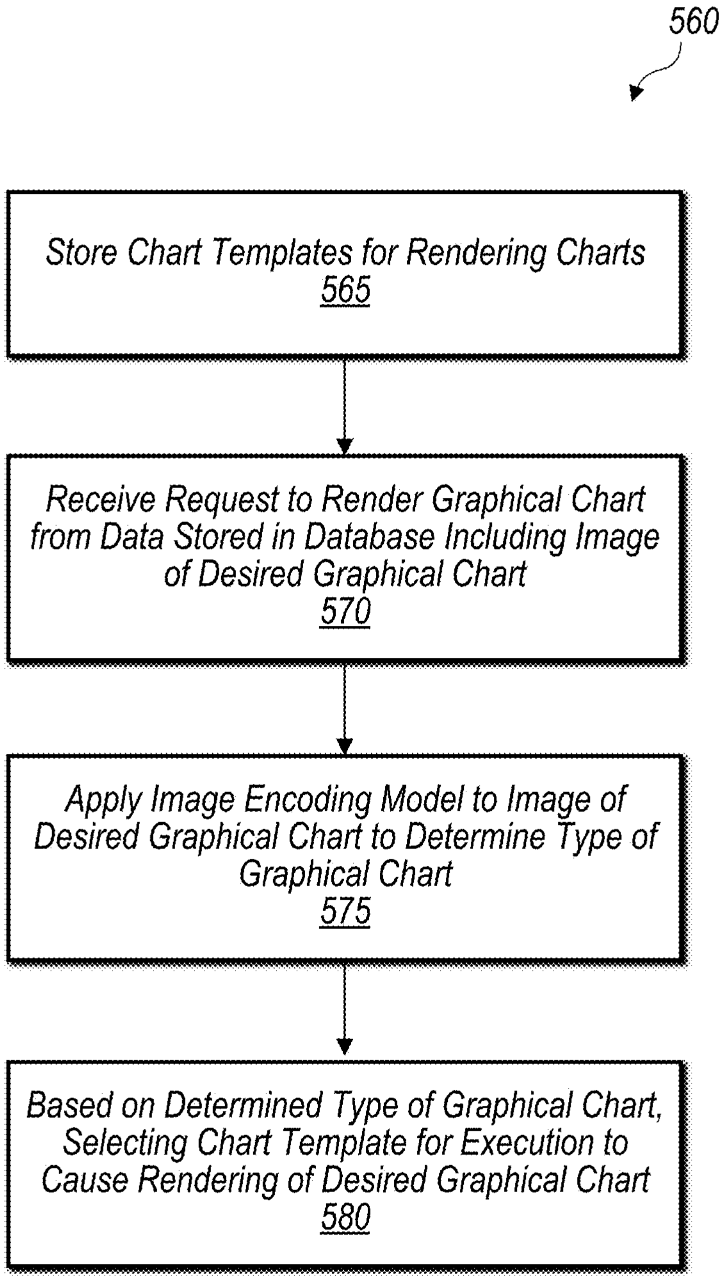

Turning now to FIG. 5C, a flow diagram of a method 560 is shown. Method 560 is one embodiment of a method performed by a computing system to select a chart template such as computing system 100. Method 560 may be performed by executing a set of program instructions stored on a non-transitory computer-readable medium.

Method 560 begins in step 565 with the computing system storing a plurality of chart templates (e.g., chart templates 150) for rendering a plurality of charts. In step 570, the computing system receives a request (e.g., request 110) to render a graphical chart (e.g., chart 440) from data stored in a database (e.g., database 420), the request including an image (e.g., image 120) of a desired graphical chart. In step 575, the computing system applies an image encoding model (e.g., encoding model 220) to the image of the desired graphical chart to determine a type of graphical chart associated with the desired graphical chart. In step 580, the computing system selects, based on the determined type of graphical chart, one of the chart templates for execution to cause rendering of the desired graphical chart. In some embodiments, the computing system determines similarities (e.g., similarity search 250) between the graphical chart embedding and stored embeddings generated from the chart templates and selects the chart template having a closest one of the similarities.

In various embodiments, method 560 further includes the computing system applies a machine learning model (e.g., query parameter model 140) to the image to determine one or more query parameters for retrieving data to populate the desired graphical chart and rendering the graphical chart using the selected chart template. The rendering include sending, to the database, a database query (e.g., database query 160) specifying the determined one or more query parameters. In some embodiments, the machine learning model includes a large visual language model (LVLM) (e.g., LVLM 320) operable to identify one or more labels in the image such that the rendered chart includes the one or more labels. In some embodiments, the determined type of chart is a line graph chart; the determined one or more query parameters include one or more parameters for rendering a line in the graph chart.

Exemplary Computer System

Figure 6:
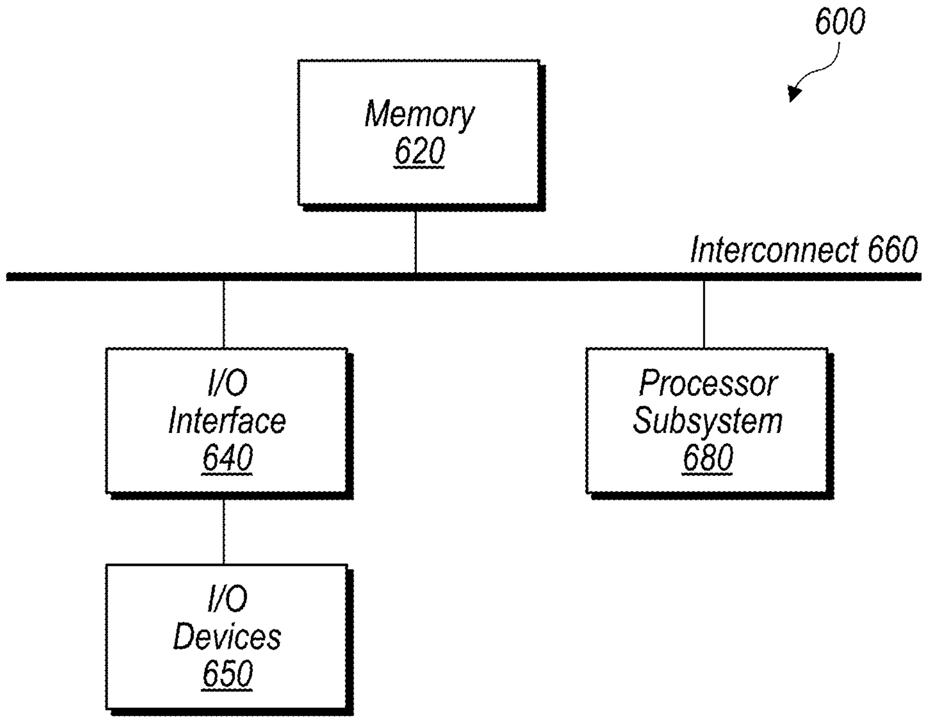
FIG. 6 is a block diagram illustrating elements of an exemplary computer system for implementing techniques described herein.

Turning now to FIG. 6, a block diagram of an exemplary computer system 600, which may implement systems 100 or 400 (or one or more components included in systems 100 or 400), is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement elements of systems 100 or 400 (e.g., elements 130, 140, 170, 420, 430, etc.) may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over Wi-Fi®, Bluetooth®, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, by a computing system, a request for program instructions to render a graphical chart from data stored in a database accessible to the computing system, wherein the request includes a graphical chart image of a desired graphical chart, wherein the graphical chart image depicts one or more labels associated with the desired graphical chart;

applying, by the computing system, a large visual language model (LVLM) to the graphical chart image to determine one or more query parameters corresponding to the one or more labels associated with the desired graphical chart, wherein determining the one or more query parameters includes:

identifying, by the LVLM, one or more potential query parameters included as text in the graphical chart image; and performing a search operation using the one or more potential query parameters and a parameter catalog of actual query parameters supported by the database to determine the one or more query parameters to be specified by a database query; and providing, by the computing system, the requested program instructions to render the graphical chart, wherein the requested program instructions include the database query specifying the determined one or more query parameters to retrieve the data from the database.

2. The method of claim 1, further comprising:

rendering, by the computing system, the graphical chart based on the provided program instructions, wherein the rendering includes:

issuing the database query to the database to retrieve data stored in the database; and representing the retrieved data in the rendered graphical chart.

3. The method of claim 2, wherein the one or more potential query parameters are unknown to the database; and wherein the rendered graphical chart includes one or more potential query parameters as the one or more depicted labels.

4. The method of claim 1, wherein the search operation includes a fuzzy search that determines editing distances between the one or more potential query parameters present in the graphical chart image and the actual query parameters in the parameter catalog.

5. The method of claim 1, wherein the actual query parameters in the parameter catalog include metric names, dimension names, and filters.

6. The method of claim 1, further comprising:

applying, by the computing system, an image encoding model to the graphical chart image of the desired graphical chart to produce a graphical chart embedding; and selecting, by the computing system and based on the graphical chart embedding, a chart template from a chart template database that includes program instructions for a plurality of chart templates; and wherein the provided program instructions include program instructions of the selected chart template.

7. The method of claim 6, wherein the selecting includes:

determining cosine similarities between the graphical chart embedding and embeddings corresponding to the chart templates; and selecting the chart template having a closest one of the cosine similarities.

8. The method of claim 6, further comprising:

prior to receiving the request for program instructions:

applying, by the computing system, the image encoding model to images of graphical charts created using the chart templates to produce chart template embeddings; and storing, by the computing system, the chart template embeddings in the chart template database.

9. The method of claim 6, wherein the selecting includes:

identifying the desired graphical chart as a pie chart; and selecting, from a chart template database, a chart template that includes program instructions for rendering the pie chart; and wherein the database query is executable by the database to retrieve data usable to size different portions of the pie chart.

10. A non-transitory computer readable medium having program instructions stored therein that are executable by a computing system to perform operations comprising:

receiving a graphical chart image of a desired graphical chart to be rendered based on data stored in a database;

applying a large visual language model (LVLM) to the graphical chart image to determine one or more query parameters associated with content present in the graphical chart image, wherein determining the one or more query parameters includes:

identifying, by the LVLM, one or more potential query parameters included as text in the graphical chart image; and performing a search operation using the one or more potential query parameters and a parameter catalog of actual query parameters supported by the database to determine the one or more query parameters to be specified by a database query; and rendering the desired graphical chart on a user interface, wherein the rendering includes sending, to the database, the database query specifying the determined one or more query parameters to retrieve the data from the database for depiction in the rendered graphical chart.

11. The non-transitory computer readable medium of claim 10, wherein the identifying includes:

identifying one or more axis labels present in the graphical chart image, wherein the rendered graphical chart presents the identified one or more axis labels.

12. The non-transitory computer readable medium of claim 10, wherein the LVLM is operable to process a hand drawn depiction of the desired graphical chart in the graphical chart image and a corresponding text description of the desired graphical chart.

13. The non-transitory computer readable medium of claim 10, wherein the operations further comprise:

applying an image encoding model to the graphical chart image of the desired graphical chart to produce a graphical chart embedding indicative of a type of graphical chart; and selecting, from a chart template database, a chart template that includes program instructions for rendering the type of graphical chart, wherein the rendering includes executing the chart template.

14. The non-transitory computer readable medium of claim 13, wherein the type of graphical chart is a bar graph chart; and wherein the determined one or more query parameters include one or more query parameters identifying particular data usable to determine sizes of bars in the bar graph chart.

15. A computing system, comprising:

one or more processors;

memory having program instructions stored therein that are executable by the one or more processors to cause the computing system to perform operations comprising:

storing a plurality of chart templates for rendering a plurality of charts;

receiving a request to render a graphical chart from data stored in a database, wherein the request includes a graphical chart image of a desired graphical chart;

applying a large visual language model (LVLM) to the graphical chart image to determine one or more query parameters for a database query to retrieve data to populate the desired graphical chart;

applying an image encoding model to the graphical chart image of the desired graphical chart to determine a type of graphical chart associated with the desired graphical chart; and based on the determined type of graphical chart, selecting one of the chart templates for execution to cause rendering of the desired graphical chart.

16. The computing system of claim 15, wherein the operations include:

determining similarities between the graphical chart embedding and stored embeddings generated from the chart templates; and selecting the chart template having a closest one of the similarities.

17. The computing system of claim 15, wherein the operations include:

rendering the graphical chart using the selected chart template, wherein the rendering includes sending, to the database, the database query specifying the determined one or more query parameters.

18. The computing system of claim 17, wherein the LVLM is operable to identify one or more labels in the graphical chart image; and wherein the rendered graphical chart includes the one or more labels identified by the LVLM.

19. The computing system of claim 17, wherein the determined type of graphical chart is a line graph chart; and wherein the determined one or more query parameters include one or more parameters for rendering a line in the graph chart.

* * * * *